US011633668B2

(12) United States Patent
Ma et al.

(10) Patent No.: US 11,633,668 B2
(45) Date of Patent: Apr. 25, 2023

(54) EYE CONTACT PROMPTING COMMUNICATION DEVICE

(71) Applicant: MOTOROLA MOBILITY LLC, Chicago, IL (US)

(72) Inventors: Chao Ma, Evanston, IL (US); Miao Song, Naperville, IL (US); Kevin Dao, Skokie, IL (US); Zhicheng Fu, Naperville, IL (US); Vivek Kumar Tyagi, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/079,433

(22) Filed: Oct. 24, 2020

(65) Prior Publication Data

US 2022/0126201 A1 Apr. 28, 2022

(51) Int. Cl.
| | |
|---|---|
| A63F 13/355 | (2014.01) |
| G06T 11/00 | (2006.01) |
| A63F 13/537 | (2014.01) |
| A63F 13/213 | (2014.01) |
| A63F 13/215 | (2014.01) |
| G06V 10/22 | (2022.01) |
| G06V 40/16 | (2022.01) |
| G06F 3/16 | (2006.01) |
| H04L 65/61 | (2022.01) |

(52) U.S. Cl.
CPC .......... *A63F 13/355* (2014.09); *A63F 13/213* (2014.09); *A63F 13/215* (2014.09); *A63F 13/537* (2014.09); *G06T 11/00* (2013.01); *G06V 10/235* (2022.01); *G06V 40/171* (2022.01); *G06F 3/167* (2013.01); *G06T 2200/24* (2013.01); *H04L 65/61* (2022.05)

(58) Field of Classification Search
CPC .... A63F 13/355; A63F 13/213; A63F 13/215; A63F 13/537; G06K 9/00281; G06K 9/2081; G06T 11/00; G06T 2200/24; G06F 3/167; H04L 65/4069
See application file for complete search history.

(56) References Cited

U.S. PATENT DOCUMENTS 8,777,630 B2 * 7/2014 Duffy .................. A61B 5/4088
434/167
8,885,882 B1 * 11/2014 Yin ....................... G06V 40/19
382/103

(Continued)

*Primary Examiner* — Malina D. Blaise
(74) *Attorney, Agent, or Firm* — Isidore PLLC

(57) ABSTRACT

A communication device, method, and computer program product prompt correct face/eye positioning to enable perceived eye-to-eye contact of a user of a video capturing device with camera on a same device side as the viewable display device. A first communication device includes a first display device having a first graphical user interface (GUI). A first image capturing device of the first communication device has a field of view that captures a face of a first user viewing the first GUI. The first image capturing device generates a first image stream of the field of view. A controller of the communication device identifies a look target area of the first GUI proximate to the first image capturing device. The controller presents visual content on the first GUI within the look target area to prompt the first user viewing the first GUI to look towards the look target area.

19 Claims, 13 Drawing Sheets

(56) References Cited

U.S. PATENT DOCUMENTS

| | | | | |
|---|---|---|---|---|
| 9,072,478 B1* | 7/2015 | Feerst | | G09B 5/065 |
| 9,244,280 B1* | 1/2016 | Tiana | | G09G 5/00 |
| 11,128,636 B1* | 9/2021 | Jorasch | | A61B 5/369 |
| 2002/0099305 A1* | 7/2002 | Fukushima | | A61B 3/113 |
| | | | | 600/300 |
| 2004/0075811 A1* | 4/2004 | Liberman | | A61H 5/00 |
| | | | | 351/203 |
| 2005/0273017 A1* | 12/2005 | Gordon | | A61B 5/4088 |
| | | | | 600/544 |
| 2006/0093998 A1* | 5/2006 | Vertegaal | | G06F 3/011 |
| | | | | 705/7.29 |
| 2006/0270945 A1* | 11/2006 | Ghajar | | A61B 5/162 |
| | | | | 600/558 |
| 2007/0166676 A1* | 7/2007 | Bird | | G09B 7/04 |
| | | | | 434/236 |
| 2007/0176040 A1* | 8/2007 | Asikainen | | B65H 26/02 |
| | | | | 242/534 |
| 2007/0248938 A1* | 10/2007 | Ronald | | G09B 17/003 |
| | | | | 434/327 |
| 2009/0051877 A1* | 2/2009 | Delahunt | | G09B 7/04 |
| | | | | 434/350 |
| 2009/0102915 A1* | 4/2009 | Arsenich | | G03B 35/24 |
| | | | | 348/E13.001 |
| 2011/0063571 A1* | 3/2011 | Duffy | | A61B 3/06 |
| | | | | 351/239 |
| 2014/0049462 A1* | 2/2014 | Weinberger | | G06F 3/013 |
| | | | | 345/156 |
| 2015/0220768 A1* | 8/2015 | Ronnecke | | G06V 40/10 |
| | | | | 348/78 |
| 2016/0109942 A1* | 4/2016 | Lyons | | G06F 3/01 |
| | | | | 345/156 |
| 2017/0055825 A1* | 3/2017 | Tumlinson | | A61B 3/0025 |
| 2019/0050630 A1* | 2/2019 | Baduge | | G06T 7/70 |
| 2019/0102608 A1* | 4/2019 | Wang | | G06T 7/11 |
| 2019/0327394 A1* | 10/2019 | Ramirez Luna | | H04N 23/51 |
| 2021/0176383 A1* | 6/2021 | Kim | | H04N 23/57 |
| 2021/0192759 A1* | 6/2021 | Lang | | G06T 3/40 |
| 2021/0287602 A1* | 9/2021 | Chen | | H04B 10/116 |
| 2021/0319408 A1* | 10/2021 | Jorasch | | G06Q 10/1095 |
| 2021/0319563 A1* | 10/2021 | Zhang | | G09G 3/20 |
| 2021/0335865 A1* | 10/2021 | Wang | | H01L 31/125 |
| 2021/0396935 A1* | 12/2021 | Chen | | H04M 1/026 |
| 2022/0019260 A1* | 1/2022 | Kang | | G06F 1/1656 |

\* cited by examiner

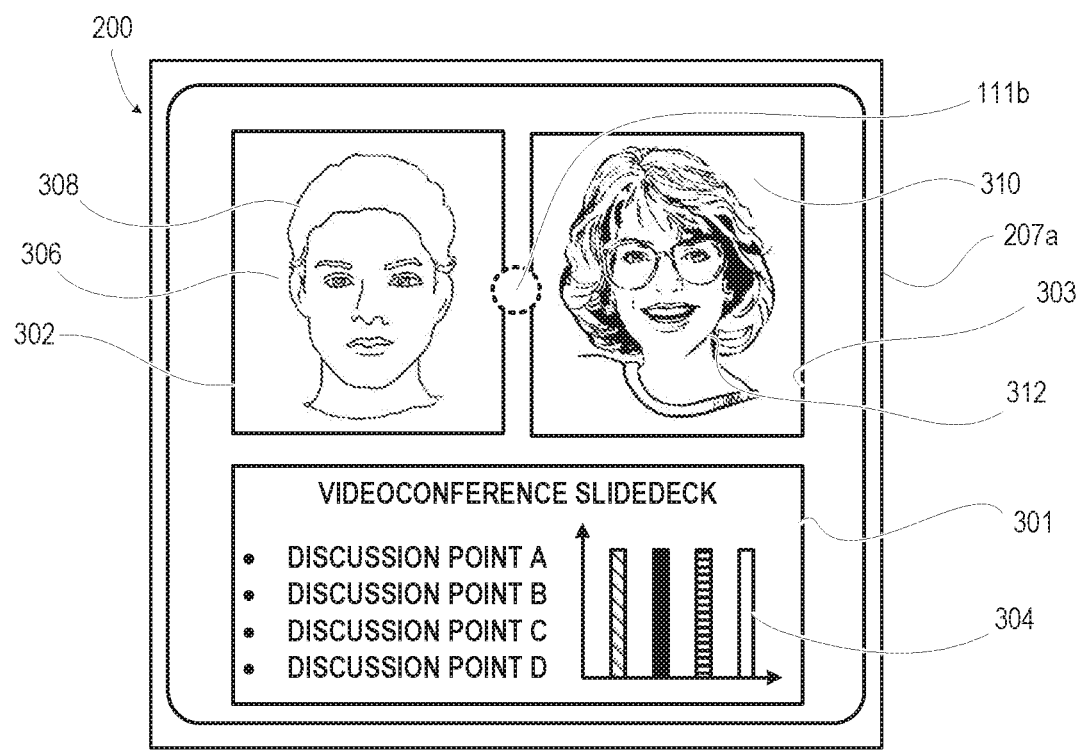
FIG. 3B
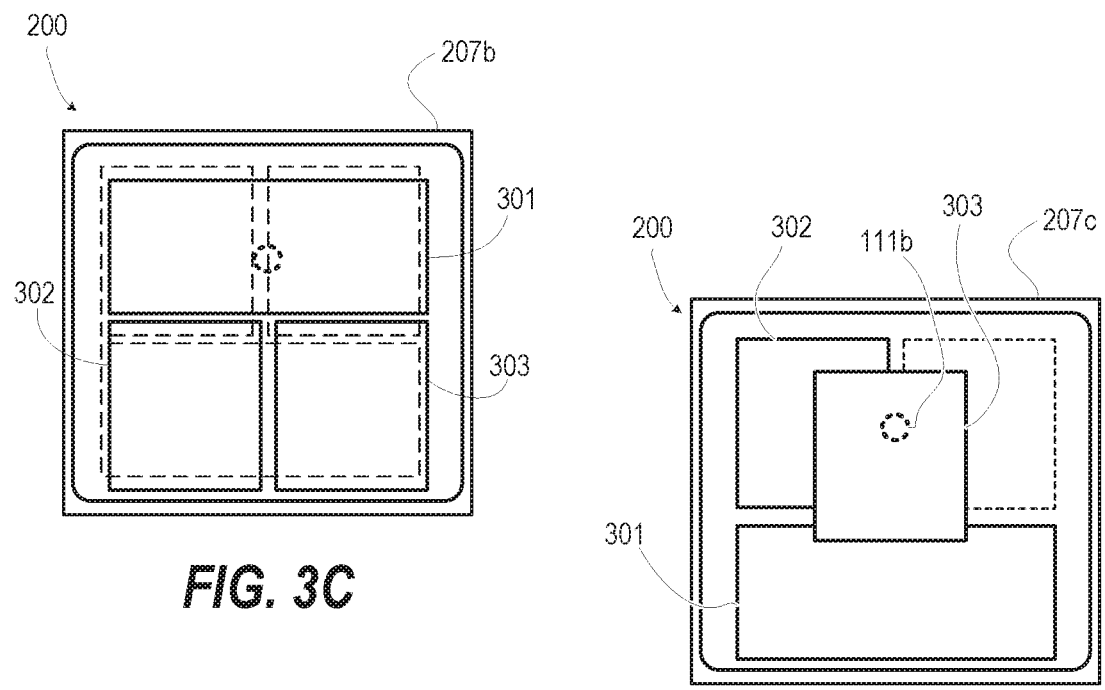
FIG. 3C
FIG. 3D ual human communication. This results in a degradation in the user experience when engaged in a virtual human communication with the device. The front side camera is typically located at a periphery of the device, away from the display screen. During the communication, the front side camera captures an image of the local user of the device if the user is located in the field of view of the camera. A front side display presents an image of the remote user of the second communicating device. With conventional video conferencing involving virtual face-to-face communication, facial expressions and gestures are viewable, making the virtual human communication more realistic. Each user looks at the displayed content on their respective communication device, which is typically not near the camera position. Gazing away from the camera can be readily apparent especially with the local user being close to a large display. Eye-to-eye contact is not facilitated, which can degrade the user experience with virtual human communication.

EYE CONTACT PROMPTING COMMUNICATION DEVICE

1. TECHNICAL FIELD

The present disclosure relates generally to communication devices having a camera and a display on a same side of the communication device, and more particularly with communication devices that record or stream an image of a user of the communication device using the camera located on the same side of the communication device as the display.

2. DESCRIPTION OF THE RELATED ART

In normal user communication, eye-to-eye contact is often desirable to convey that the communicating parties are paying attention and/or is interest in what the other user is saying. User communication devices such as mobile phones, desktop workstations, laptops, and tablets are often equipped with a front side camera and microphone to enable virt

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3B is a front view of the first communication device presenting multiple visual elements during a videoconference, according to one or more embodiments;

FIG. 3C is a front view of the first communication device of FIG. 3B with first example priority visual content of the multiple visual elements being moved to provide a look target prompt, according to one or more embodiments;

FIG. 3D is a front view of the first communication device of FIG. 3B with second example priority visual content of the multiple visual elements being moved to provide a look target prompt, according to one or more embodiments;

DETAILED DESCRIPTION

Figure 1:
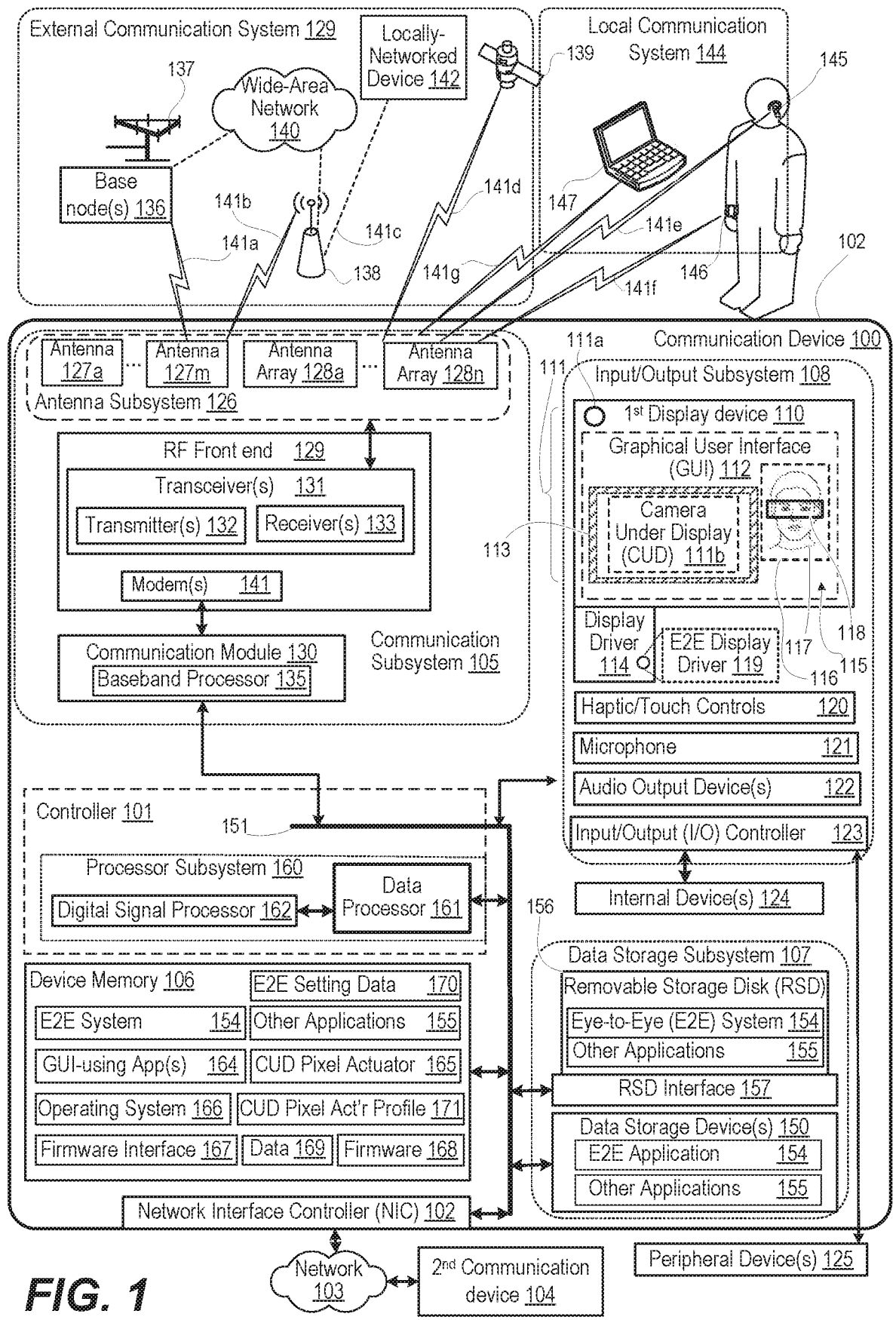
FIG. 1 depicts a functional block diagram of a communication device that operates in a communication environment and within which the features of the present disclosure are advantageously implemented, according to one or more embodiments.

According to aspects of the present disclosure, a communication device, computer program product, and method prompt correct eye-positioning to provide perceived eye-to-eye contact for a user being captured by a camera device that is located on a same side of the communication device as a display screen. A first communication device includes a first display device that presents a first graphical user interface (GUI). A first image capturing device of the first communication device has a field of view that captures a face of a first user viewing the first GUI. The first image capturing device generates a first image stream of the field of view. The first communication device includes a controller that is communicatively coupled to the first display device and the first image capturing device. The controller identifies a look target area of the first GUI proximate to the first image capturing device. The controller presents visual content on the first GUI within the look target area to prompt the first user viewing the first GUI to look towards the look target area.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of communication device 100, which is managed by controller 101, in an operating environment within which the features of the present disclosure are advantageously implemented. According to one aspect, communication device 100 is a fixed, portable, mobile, or hand-held device having housing 102. Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless communication functionality. In one or more embodiments communication device 100 is a first communication device that has a network interface controller (NIC) 102 that supports at least one of wired and wireless communication via network 103 with second communication device 104. As a device supporting wireless or wired communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In one or more embodiments, communication device 100 includes communication subsystem 105, device memory 106, data storage subsystem 107, and input/output (I/O) subsystem 108. Device memory 106 and each subsystem (105, 107, and 108) are managed by controller 101. I/O subsystem 108 has user interface devices that include at least one first display device 110. I/O subsystem 108 includes at least one front side image capturing device 111 proximate to first display device 110. In one or more embodiments, front side image capturing device 111 includes camera 111a that is peripheral to graphical user interface (GUI) 112 presented by first display device 110. GUI 112 is composed of individually actuated pixels in an array that can present imagery. In one or more alternate embodiments, front side image capturing device 111 includes camera under display (CUD) 111b, which is an image capturing device that is located under GUI 112. A portion of pixels of GUI 112, which is described herein as look target area 113, are in front of, or near to, CUD 111b. The x, y coordinates $(x_0, y_0\text{-}x_1, y_1)$ of pixels that are within look target area 113 can be customized for particular versions of communication device 100 (see FIG. 2A). The pixels of GUI 112 are illuminated by display driver 114. Display driver 114 directs GUI 112 of first display device 110 to present visual elements 115 such as insets 116, streaming images or video 117, and annotations 118. Aspects of the present disclosure for prompting eye-to-eye exchanges can be implemented through display driver 114.

In one or more embodiments, components of communication device 100 can provide visual elements 115 via display driver 114 without directly producing an eye-to-eye prompt. Independent of what display driver 114 is directing, controller 101 prompts eye-to-eye exchange via E2E display driver 119. In the illustrative embodiment, eye-to-eye (E2E) display driver 119 is a special logic block (illustrated as a circle) incorporated in display driver 114. In one or more embodiments, E2E display driver 119 generates visual elements 115. In one or more embodiments, E2E display driver 119 does not generate visual elements 115 but can adjust or alter illumination of pixels of look target area 113 that are in front of or near CUD 111b. For example, E2E display driver 119 can change a color of look target area 113 to capture the attention of user. E2E display driver 119 can also attenuate an illumination level of look target area 113 to capture the attention of user. In one or more embodiments, the attenuation is to discrete brightness levels such as 50% and 0% (off). In one or more embodiments, E2E device driver 119 can also attenuate illumination of look target area 113 for other reasons, such as enhancing image capture by CUD 111b I/O subsystem 108 can include other user interface devices such as touch/haptic controls 120, microphone 121, and audio output device(s) 122. I/O subsystem 108 also includes I/O controller 123. I/O controller 123 connects to internal devices 124 that are internal to housing 102 and to peripheral devices 125, such as external speakers that are external to housing 102 of communication device 100.

Examples of internal devices 124 are computing, storage, communication, or sensing components depicted within housing 102 that do not support direct connection to other components of communication device 100. I/O controller 123 supports the necessary configuration of connectors, electrical power, communication protocols, and data buffering to interface internal devices 124 and peripheral devices 124 to other components of communication device 100 that use a different configuration for inputs and outputs.

Communication subsystem 105 includes antenna subsystem 126 having lower band antennas 127a-127m and higher band antenna arrays 128a-128n. Communication subsystem 105 includes radio frequency (RF) front end 129 and communication module 130. RF front end 129 has transceiver(s) 131, which includes transmitter(s) 132 and receiver(s) 133. RF front end 129 further includes modem(s) 134. Communication module 130 of communication subsystem 105 has baseband processor 135. Baseband processor 135 communicates with controller 101 and RF front end 129. Baseband processor 135 operates in baseband frequency range to encode data for transmission and decode received data, according to a communication protocol. Modem(s) 134 modulate baseband encoded data from communication module 130 onto a carrier signal to provide a transmit signal that is amplified by transmitter(s) 132. Modem(s) 134 demodulates each signal received from external communication system 129 detected by antenna subsystem 126. The received signal is amplified and filtered by receiver(s) 133, which demodulate received encoded data from a received carrier signal.

In one or more embodiments, controller 101, via communication subsystem 105, performs multiple types of over-the-air (OTA) or wireless communication with external communication system 129. External communication system 129 can include devices such as base node(s) 136 elevated on respective radio tower(s) 137, access node(s) 138, and global positioning system (GPS) satellites 139. Some of these devices can be communicatively coupled to at least one wide area network 140. Communication subsystem 105 communicates via OTA communication channel(s) 141a with base node 136. Communication subsystem 105 communicates via wireless communication channel(s) 141b with access node 138. In one or more particular embodiments, access node 138 supports communication using one or more IEEE 802.11 wireless local area network (WLAN) protocols. Access node 138 is connected to wide area network 140, such as the Internet. In one or more particular embodiments, communication subsystem 105 communicates with one or more locally networked devices 142 via wired or wireless link 141c provided by access node 138. Communication subsystem 105 receives downlink broadcast channel(s) 141d from GPS satellites 139 to obtain geospatial location information.

In one or more embodiments, local communication system 144 includes wireless headset 145 and smart watch 146 that are coupled to communication device 100 to form a personal access network (PAN). Communication subsystem 105 communicates via low power wireless communication channel(s) 141e with headset 145. Communication subsystem 105 communicates via second low power wireless communication channel(s) 141f, such as Bluetooth, with smart watch 146. In one or more particular embodiments, communication subsystem 105 communicates with other communication device(s) 147 via wireless link 141g to form an ad hoc network.

Data storage subsystem 107 of communication device 100 includes data storage device(s) 150. Controller 101 is communicatively connected, via system interlink 151, to data storage device(s) 150. Data storage subsystem 107 provides nonvolatile storage that is accessible by controller 101. For example, data storage subsystem 107 can provide a selection of program code and applications such as eye-to-eye (E2E) system 154 and other application(s) 155 that can be loaded into device memory 106. In one or more embodiments, data storage device(s) 150 can include hard disk drives (HDDs), optical disk drives, and/or solid-state drives (SSDs), etc. Data storage subsystem 107 of communication device 100 can include removable storage device(s) (RSD(s)) 156, which is received in RSD interface 157. Controller 101 is communicatively connected to RSD 156, via system interlink 151 and RSD interface 157. In one or more embodiments, RSD 156 is a non-transitory computer program product or computer readable storage device. Controller 101 can access RSD 156 or data storage device(s) 150 to provision communication device 100 with program code, such as E2E system 154 and other applications 155. When executed by controller 101, the program code causes or configures communication device 100 to provide the functionality described herein.

Controller 101 includes processor subsystem 160, which includes one or more central processing units (CPUs), depicted as data processor 161. Processor subsystem 160 can include one or more digital signal processors 162 that are integrated with data processor 161 or are communicatively coupled to data processor 161, such as baseband processor 135. In one or embodiments that are not depicted, controller 101 can further include distributed processing and control components that are peripheral or remote to housing 102 or grouped with other components, such as I/O subsystem 108. Data processor 161 is communicatively coupled, via system interlink 151, to device memory 106. In one or more embodiments, controller 101 of communication device 100 is communicatively coupled via system interlink 151 to communication subsystem 105, data storage subsystem 107, and input/output subsystem 108. System interlink 151 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 151) are illustrated in FIG. 1, it is to be understood that more, fewer, or different interconnections may be present in other embodiments.

Controller 101 manages, and in some instances directly controls, the various functions and/or operations of communication device 100. These functions and/or operations include, but are not limited to including, application data processing, communication with other communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Device memory 106 includes program code and applications such as E2E system 154, GUI-generating application(s) 164, CUD pixel actuator 165, and other application(s) 155. CUD pixel actuator 165 is program code that causes E2E display driver 119 to alter or adjust illumination or color of pixels of look target area 113 in front of or near CUD 111b. Device memory 106 further includes operating system (OS) 166, firmware interface 167, such as basic input/output system (BIOS) or Uniform Extensible Firmware Interface (UEFI), and firmware 168. Device memory 106 includes data 169 used by E2E system 154 and GUI-generating application(s) 164. E2E system 154 configures communication device 100 according to E2E setting data 170 in device memory 106. E2E system 154 accesses CUD pixel actuator profile 171 to identify one or more of: (i) pixel coordinates of CUD 111b; (ii) pixel coordinates of look target area 113; and (iii) pixel adjustment presets, such as 100% attenuation, 50% attenuation, color substitution, etc.

Based on E2E setting data 170, E2E system 154 can enable GUI-generating application(s) 164 to participate in and indirectly control eye-to-eye prompting with a hardware agnostic approach. In particular, E2E system 154 handles both identification of E2E status and E2E response via CUD pixel actuator 165, which controls E2E display driver 119. Based on E2E setting data 170, E2E system 154 can alternatively enable GUI-generating application(s) 164 to directly manage eye-to-eye prompting by provisioning GUI-generating application(s) 164 with information required to control display driver 114 and/or E2E display driver 119. GUI-generating application(s) 165 can move eye-catching visual content to the coordinates of look target area 113 or can alter/adjust look target area 113 by controlling E2E display driver 119. Processor subsystem 160 of controller 101 executes program code to provide operating functionality of communication device 100. The software and/or firmware modules have varying functionality when their corresponding program code is executed by processor subsystem 160 or secondary processing devices within communication device 100. Processor subsystem 160 of controller 101 can execute program code of E2E system 154 to provide improved user face positioning, eye gaze direction, and/or eye-to-eye communication with one or more communication devices 104 and 147.

Figure 2A:
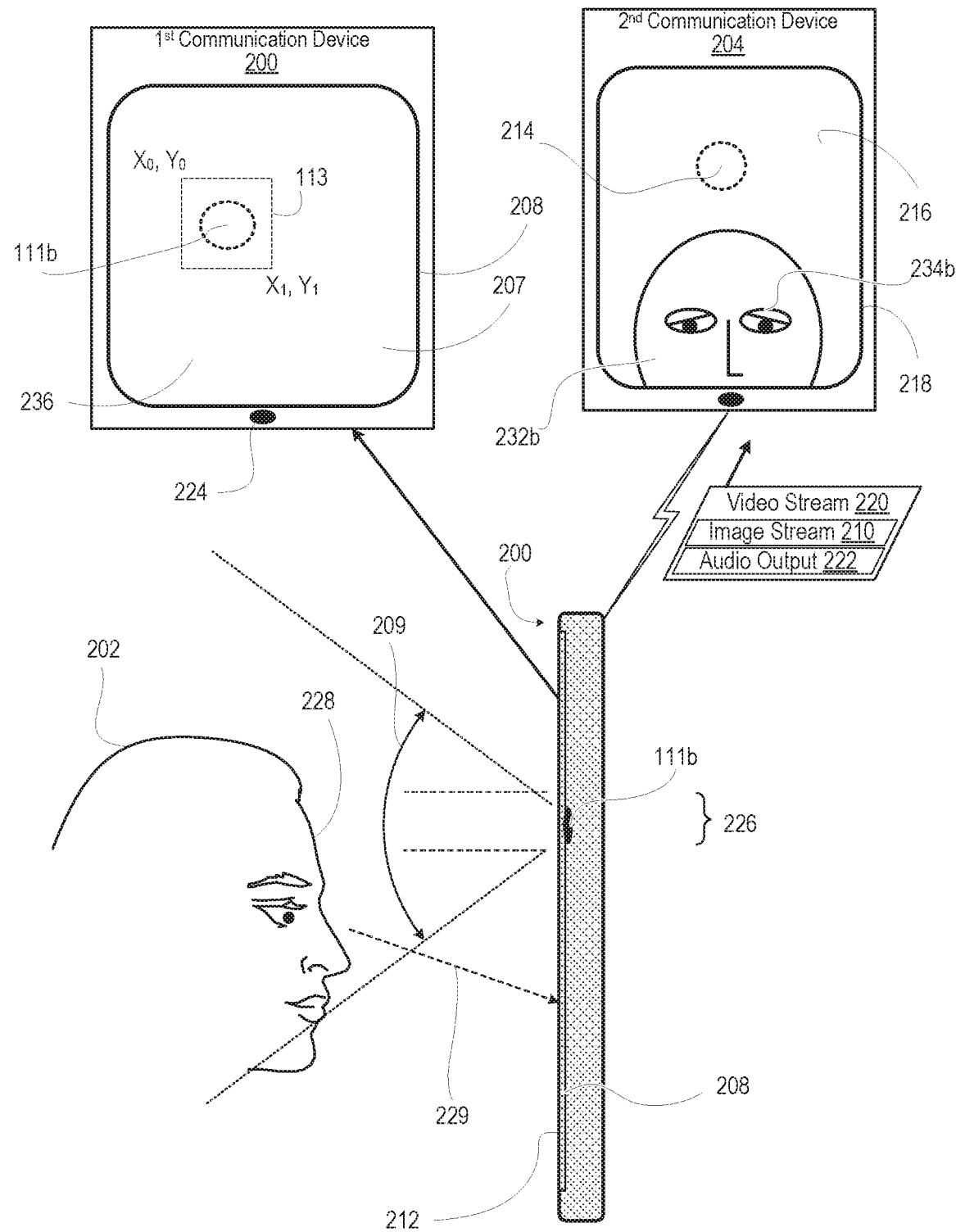
FIG. 2A is a diagram depicting both a side view and front view of a first communication device with an inactive eye-to-eye prompt application and a display view of a second communication device, according to one or more embodiments.

FIG. 2A is a diagram depicting a side view and a front view of first communication device 200 that is being used by first user 202 to engage in one-way virtual communication with another user, who is using second communication device 204. Second communication device 204 is depicted in front side view. First communication device 200 can include components identical or similar to those described above for communication device 100 (FIG. 1). First CUD 111b, located behind first GUI 207 presented on first display device 208 of first communication device 200, has a field of view (FOV) 209 through which first CUD captures first image stream 210. First user 202 is viewing first display device 212 of first communication device 200. Second communication device 204 has a similarly positioned second CUD 214, which is behind second GUI 216 of second display device 218. First user 202 can be using first communication device 200 to perform one-way virtual communication to either record for playback or stream live first video stream 220 that includes first image stream 210 captured by first CUD 111b and can also (optionally) include first audio output 222 sensed by first microphone 224. First CUD 111b of first communication device 200 defines a vertical spatial target area 226 within field of view (FOV) 209 for proper facial positioning by first user 202. First user 202 has face 228 below the vertical spatial target area 226 of first FOV 209. First user 202 has direction of gaze 229 that is not toward first CUD 111b. For clarity, the size of first display device 212 of first communication device 200 is large relative to the imaged size of face 228 of first user 202 at a particular distance. The relative size makes gaze direction of first user 202 apparent in image stream 210 captured by first CUD 111b. Direction of gaze 229 becomes less noticeable for a small display or for a person farther away from the display Thus, when first image stream 210 is presented on second display device 218 of second communication device 204, face image 232b of first user 202 positions eye images 234b well below second CUD 214 of second communication device 204. In addition, the downward gaze of face image 232b is readily apparent to a user of second communication device 204. Visual content 236 on first GUI 207 of first communication device 200 does not include any prompting of first user 202 to properly position head and direction of gaze for perceived virtual eye-to-eye contact on second GUI 216 of second communication device 204.

Figure 2B:
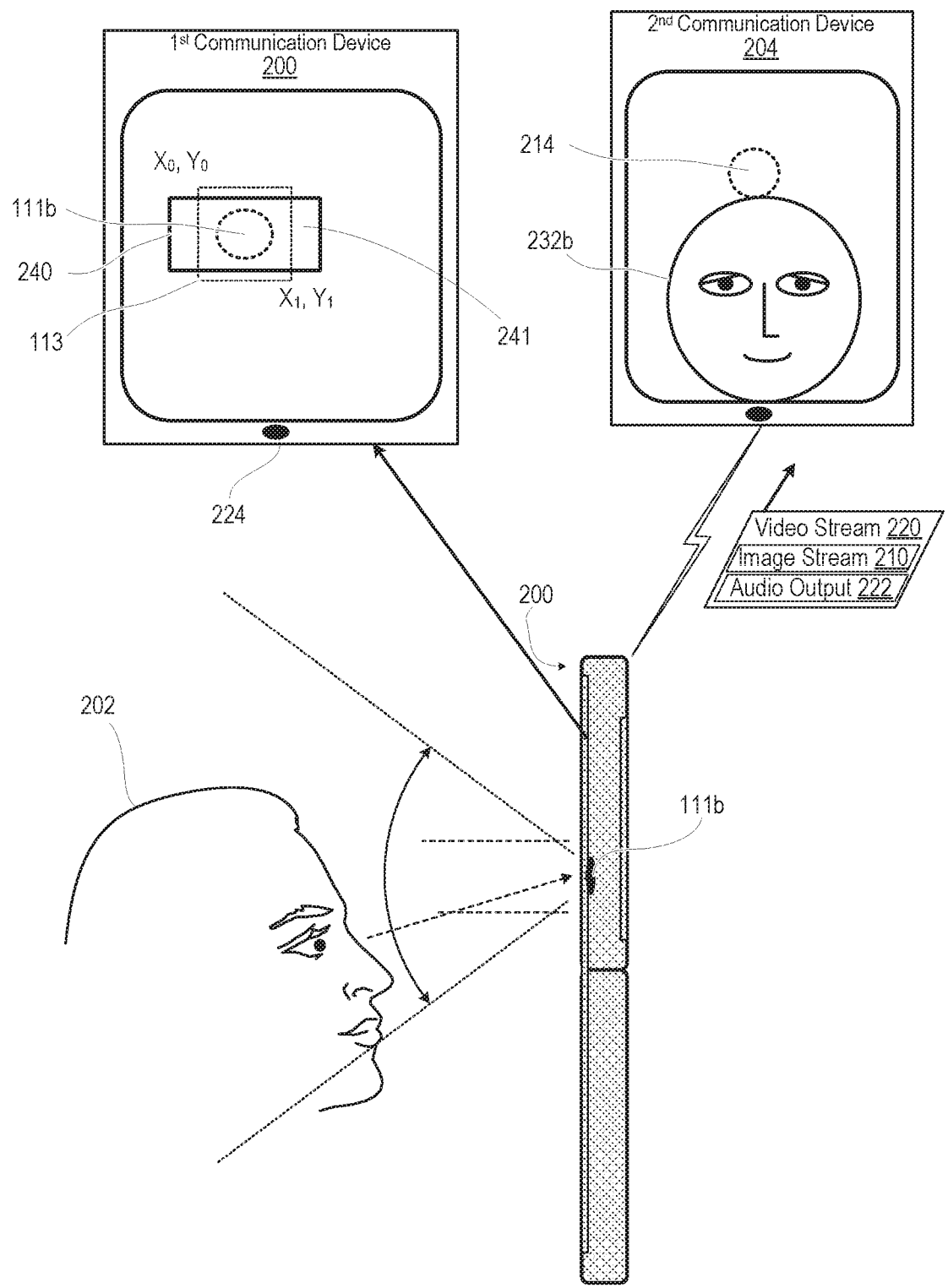
FIG. 2B is a diagram depicting both a side view and front view of the first communication device with an active look target prompt of the eye-to-eye prompt application and a display view of the second communication device, according to one or more embodiments.

FIG. 2B is a diagram depicting both a side view and front view of first communication device 200 that is being used by first user 202 to engage in one-way virtual communication with another user, who is using second communication device 204. Second communication device 204 is depicted in front side view. First communication device 200 is either recording for playback or streaming live first video stream 220 that includes first image stream 210 captured by first CUD 111b and can also (optionally) include first audio output 222 sensed by first microphone 224. First communication device 200 prompts first user 202 to look at first CUD 111b by presenting visual content 240 in look target area 241 proximate to first CUD 111b. In one or more embodiments, prompting apparent eye-to-eye contact in first image stream 210 is sufficient without also prompting alignment of head position of first user 202. Prompting head positioning of first user 202 provides a benefit to first user 202 by facilitating natural compliance of eye-to-eye contact response by a second user of second communication device 202 discussed below for FIGS. 2C-2D. Certain use cases of eye-to-eye prompting by first communication device 200 do not necessarily benefit from head position prompting. For example, a user of second communication device 204 may not be transmitting back an image. Consequently, positioning eye images 234b to coincide with second CUD 214 by positioning face image 232b is not necessary. First user 202 in this scenario is not receiving a return eye contact. Instead, first user 202 may choose to position face image 232b in another position within first image stream 210, such as to allow other visual elements in a top portion of first image stream 210. In one or more embodiments, first video stream 220 is a video blog ("vlog") recording in which first user 202 chooses to be positioned off-center, such as to show a hat in a close up view. In one or more embodiments, first video stream 220 is being streamed live, but second communication device 204 is responding with audio only.

Figure 2C:
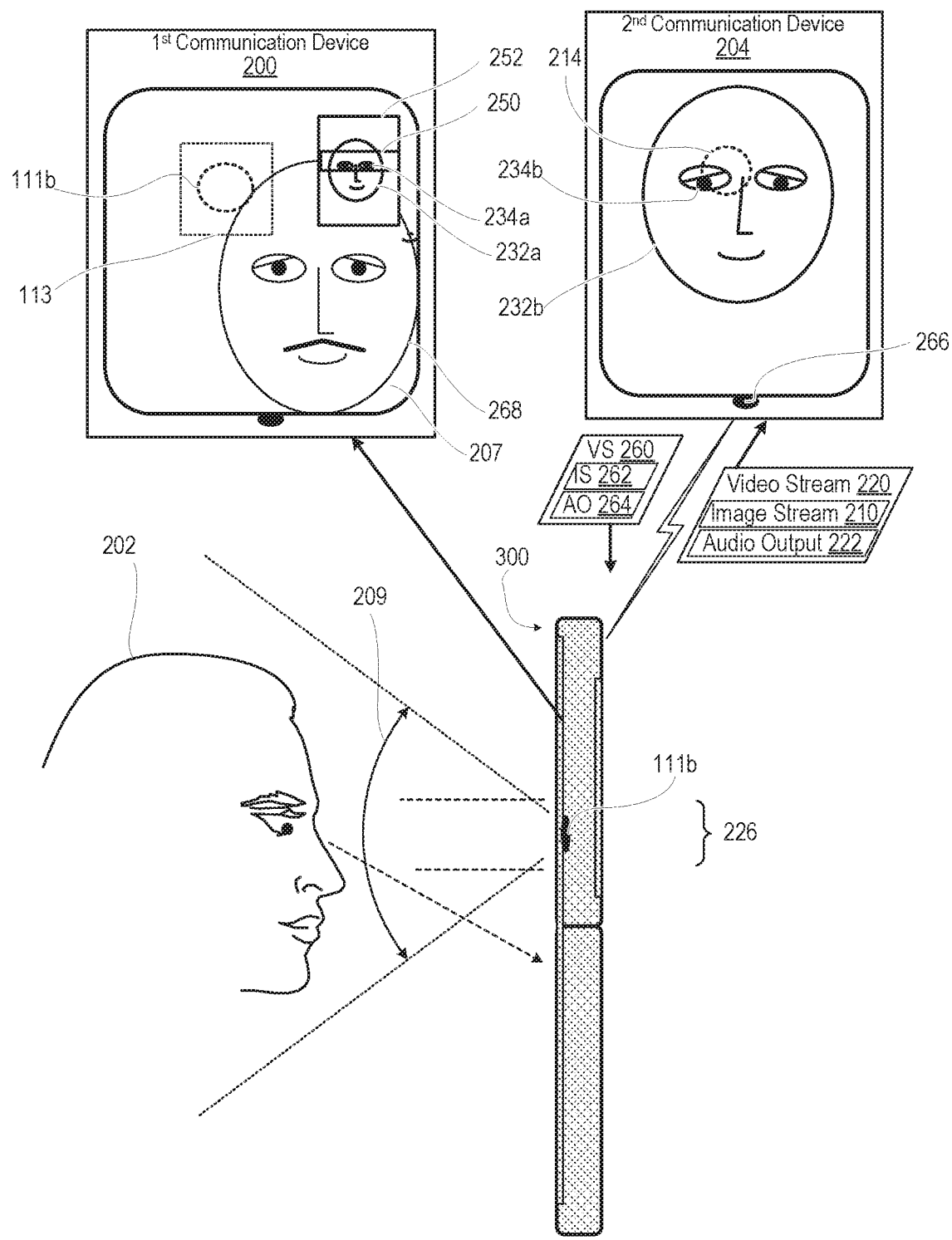
FIG. 2C is diagram depicting both a side view and front view of the first communication device with an active head position prompt of the eye-to-eye prompt application and a display view of the second communication device, according to one or more embodiments.

FIG. 2C is a diagram depicting both a side view and front view of first communication device 200 that is being used by first user 202 to engage in two-way virtual communication with another user, who is using second communication device 204. Second communication device 204 is depicted in front side view. First communication device 200 identifies vertical spatial target area 226 within FOV 209 for proper facial positioning by first user 202. First communication device 200 presents head positioning indication 250 on inset portion 252 of first GUI 207. First communication device 200 presents first image stream 210 including face image 232a in inset portion 252. Head positioning indication 250 corresponds to vertical spatial target area 226 to prompt first user 202 to position first user's head so that eye images 234a are aligned with head positioning indication 250. Face image 232b within first image stream 210 is presented in alignment with second CUD 214 of second GUI 216 of second communication device 204. Even if second communication device 204 is not provisioned with eye-to-eye prompting, the alignment of face image 232b provides assistance to the user of second communication device 204 who can naturally reciprocate with eye contact to second CUD 214. In one or more embodiments, having proper head alignment is a requisite for then initiating gaze direction prompting by first communication device 200. Eye images 234a-234b of first image stream 210 are downward gazing. In one or more embodiments, second communication device 204 is streaming second image stream 162. In one or more embodiments, second communication device 204 is streaming second video stream 260 that includes second image stream 262 captured by second CUD 214 and second audio output 264 sensed by second microphone 266. Second face image 268 of second video stream 260 is not aligned with first CUD 111b of first communication device 200, creating an opportunity for improvement described for FIG. 3A below. Look target area 241 (FIG. 2B) is not presenting visual elements that first user 202 would naturally be drawn to gaze at. Although prompting can be used to motivate first user 202 to stare at look target area 241, the opportunity relates to naturally encouraging first user 202 to look at look target area 241.

Figure 2D:
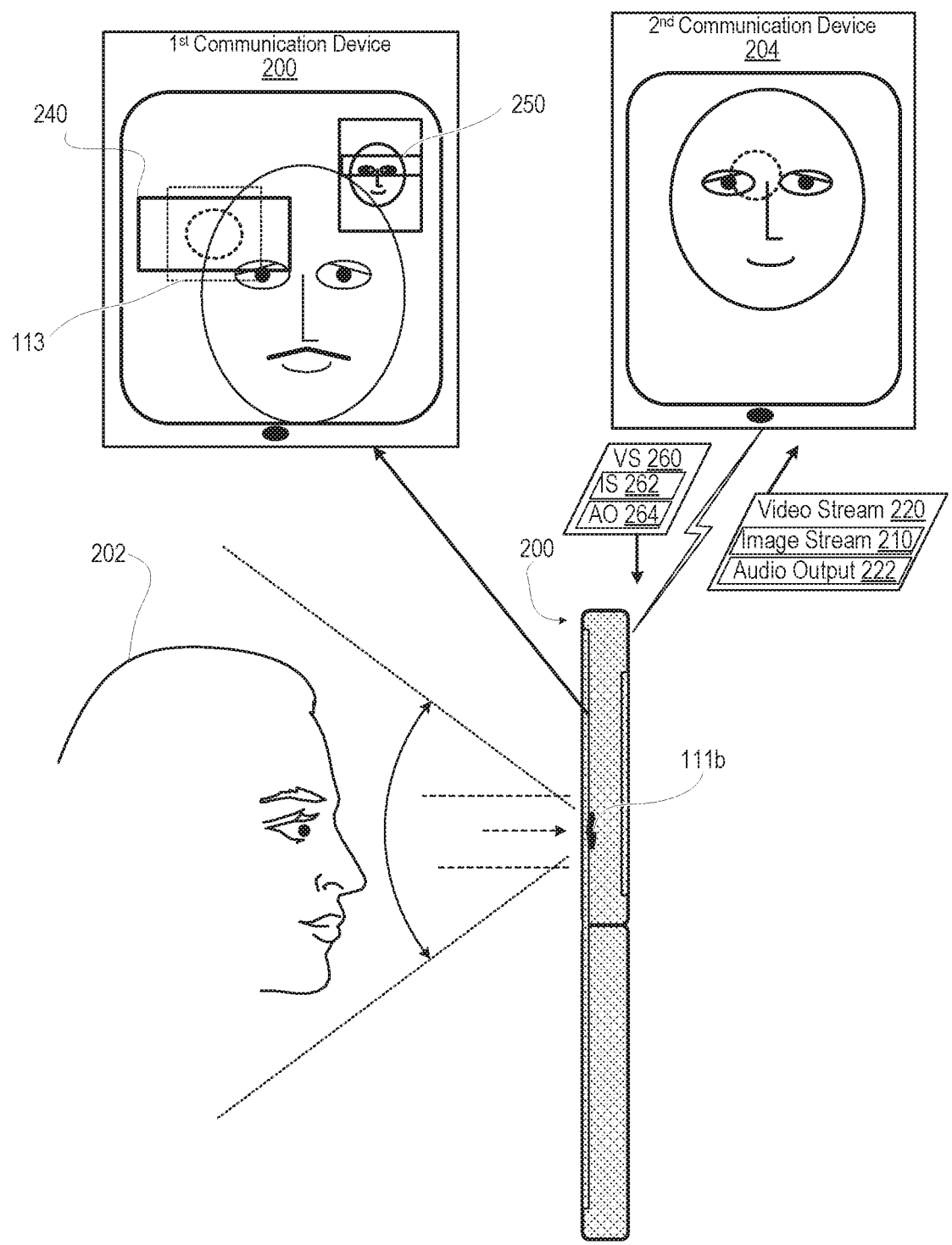
FIG. 2D is diagram depicting both a side view and front view of the first communication device with active look target and head position prompts of the eye-to-eye prompt application and a display view of the second communication device, according to one or more embodiments.

FIG. 2D is a diagram of both a side view and front view of first communication device 200 that is being used by first user 202 to engage in two-way virtual communication with another user, who is using second communication device 204. Second communication device 204 is depicted in front side view. In addition to providing head positioning indication 250, communication device 200 introduces eye gaze prompting with visual content 240. In one or more embodiments, communication device 200 responds to the downward gaze of first user 202 in FIG. 2C by providing visual content 240 to prompt eye-to-eye contact with first CUD 111b.

Figure 3A:
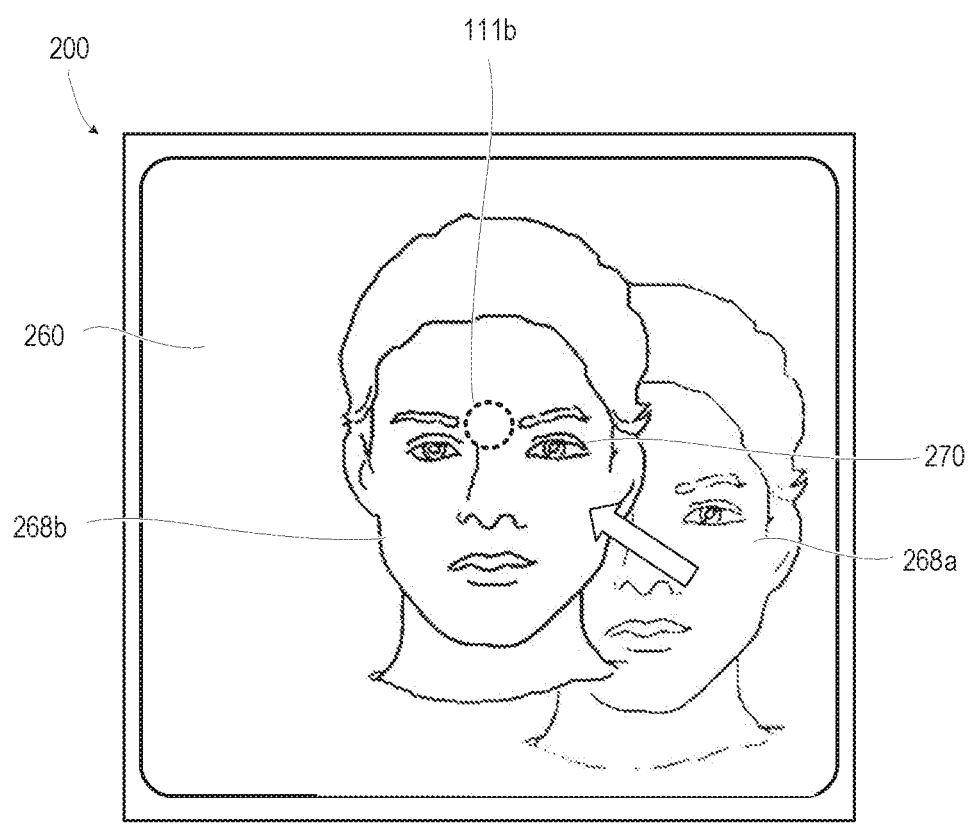
FIG. 3A is a front view of the first communication device with visual content being moved to provide a look target prompt, according to one or more embodiments.

FIG. 3A is a front view of first communication device 200 receiving second video stream 260. Second face image 268a of second video stream 260 is not aligned with first CUD 111b of first communication device 200. In order to prompt eye-to-eye contact, communication device repositions the visual content of second face image 268b to align second eye images 270 with first CUD 111b. When first user 202 (FIG. 2D) looks at second eye images 270, eye-to-eye contact is simulated.

FIG. 3B is a front view of first communication device 200 having first CUD 111b under first GUI 207a that is presenting multiple visual elements 301-303 during a videoconference. First visual element 301 across a bottom portion of first GUI 207a presents meeting visual aid information 304. Second visual element 302 in a left upper quadrant presents a second video stream 306 of second face image 308. Third visual element 303 in a right upper quadrant presents a third video stream 310 of a third face image 312. In one or more embodiments, communication device 200 determines which visual element 301-303 is a priority for presenting as visual content proximate to first CUD 111b.

FIG. 3C is a front view of first communication device 200 having a first example GUI with multiple visual elements 301-303 that can be is repositioned during a videoconference. Third example GUI 207b has first visual element 301 moved up in alignment with first CUD 111b. First visual element 301 can be assigned a higher priority as a type of content that tends to receive attention of first user 202 (FIG. 2D).

FIG. 3D is a front view of first communication device 200 having a second example repositioning of multiple visual elements 301-303 during a videoconference. First visual element 301 can be assigned a higher priority based on detecting that the gaze of first user 202 (FIG. 2D) is remaining on first visual element 301. Fourth example GUI 207c has third visual element 303 centered to be over first CUD 111b in response to third video stream 310 being designated as the content of importance for viewing by first user 202, such as in response to detecting audio output from third video stream 310 that is above an audio threshold.

Figure 4:
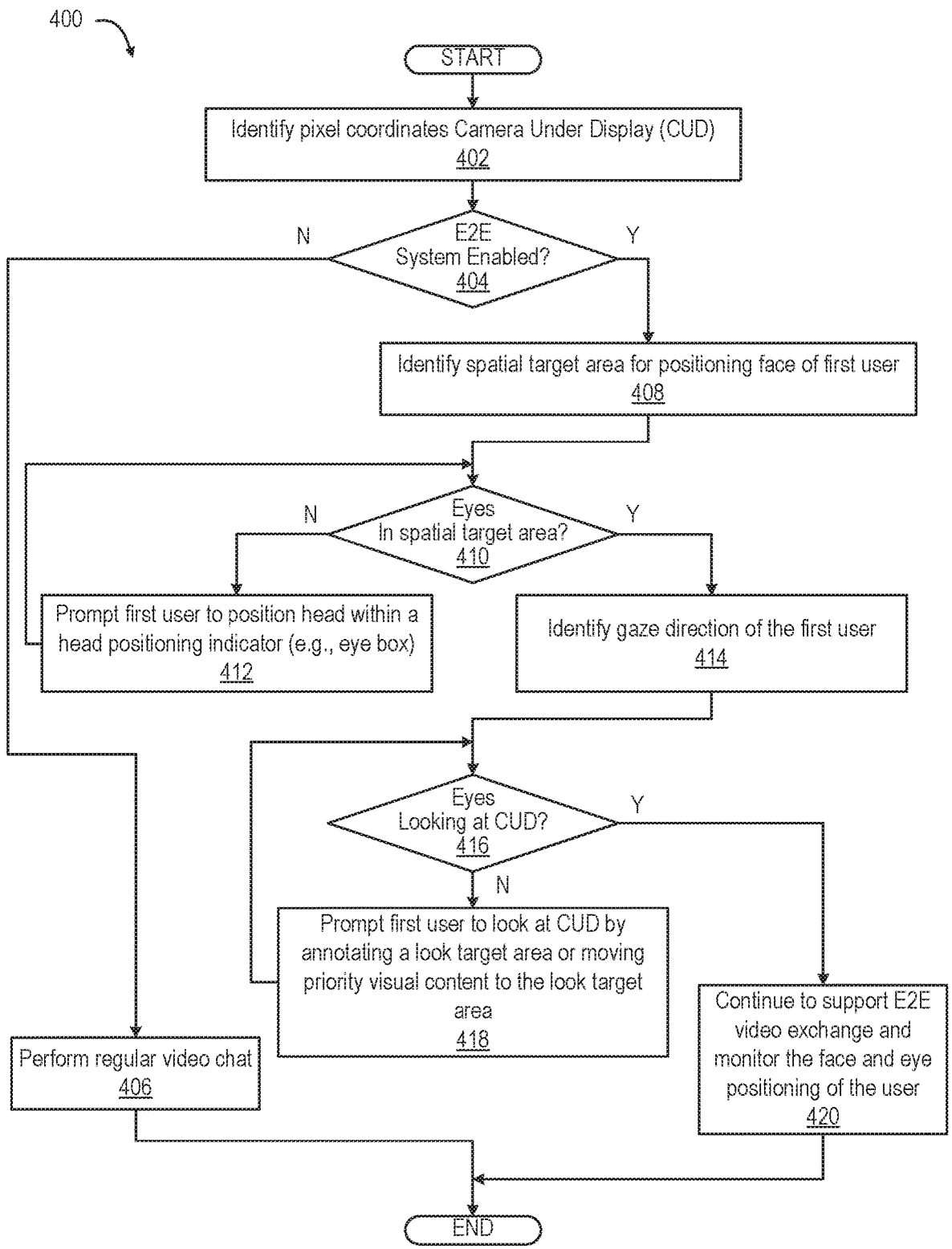
FIG. 4 presents a flow diagram of a method for system management of an eye-to-eye system for graphical user interface (GUI) generating applications, according to one or more embodiments.

FIG. 4 presents a flow diagram of method 400 for system management of an eye-to-eye prompting. In one or more embodiments, method 400 configures system management for enabling direct or indirect control of eye-to-eye contact prompting by GUI-generating applications. The description of method 400 is provided with general reference to the specific components illustrated within the preceding FIGS. 1, 2A-2D, and 3A-3B. In at least one embodiment, communication device 100 (FIGS. 1, 2A-2D, and 3A-3B) performs method 400 using display device 110 and image capturing device 111b, managed by controller 109 (FIG. 1). Specific components described in method 400 can be identical or similar to specific components of the same name used to describe preceding FIGS. 1, 2A-2D, and 3A-3B.

Method 400 includes identifying, by an eye-to-eye (E2E) system, pixel coordinates associated with a location under a display device at which a camera under display (CUD) is positioned (block 402). In one embodiment, E2E system is configured for a particular hardware implementation of communication device 100 (FIG. 1). Also, in one embodiment, the communication device 100 (FIG. 1) can be configured such that a user input could toggle between enable or disable use of the E2E system. In another embodiment, a particular hardware configuration could be incompatible with use of the E2E system. In yet another embodiment, a particular operating mode of the communication device may not benefit from use of E2E system. Examples of this embodiment include a low power mode or a low ambient light environment without sufficient facial recognition capability. Returning to the flow chart, method 400 includes determining, in decision block 404, whether the E2E system is enabled. In response to determining that E2E system is disabled, method 400 includes performing regular video exchange, such as chat without adjusting the GUI or prompting the user to adjust his/her gaze or face position (block 406). Then method 400 ends.

In response to determining that the E2E system is enabled, method 400 includes identifying a spatial target area for positioning a face of a first user (block 408). Method 400 includes determining whether eyes of the first user are in the spatial target area (decision block 410). In response to determining that the eyes of the first user are not in the spatial target area, method 400 includes prompting the first user to position their head within a head positioning indicator (e.g., eye box) (block 412). Then method returns to block 410. In response to determining that the eyes of the first user are in the spatial target area, method 400 includes identifying a gaze direction of the first user (block 414). For example, head orientation recognition or eye lid and pupil image recognition can be performed to identify whether the eyes of the first user are aligned with the CUD. For another example, a vector direction of the gaze can be identified and is associated with particular visual content displayed on the communication device. Method 400 includes determining, in decision block 416, whether the eyes of the first user are looking at the CUD. In response to determining that the eyes of the first user are not looking at the CUD, method 400 includes prompting the first user to look at the CUD by annotating a look target area or moving priority visual content to the look target area (block 418). Then method 400 returns to decision block 416. In response to determining that the eyes of the first user are looking at the CUD, method 400 includes continuing to support E2E video exchange and monitoring the face and eye positioning of the user (block 420). Then method 400 ends.

FIGS. 5A-5E (FIG. 5) presents a flow diagram of method 500 for prompting eye-to-eye exchange during a virtual human communication session. Method 500 includes prompting a first user of a first communication device to benefit a second user of a second communication device during a one-way virtual human communication session. Method 500 includes prompting a first user of a first communication device to benefit both the first user and the second user. In one or more embodiments, second communication device can also prompt second user to provide additional eye-to-eye contact benefit for first user. The description of method 500 is provided with general reference to the specific components illustrated within the preceding FIGS. 1, 2A-2D, 3A-3B, and 4. In at least one embodiment, communication device 100 (FIGS. 1, 2A-2D, 3A-3B, and 4) performs method 500 using display device 110 and image capturing device 111b, managed by controller 109 (FIG. 1). Specific components described in method 500 can be identical or similar to specific components of the same name used to describe preceding FIGS. 1, 2A-2D, 3A-3B, and 4.

Figure 5A:
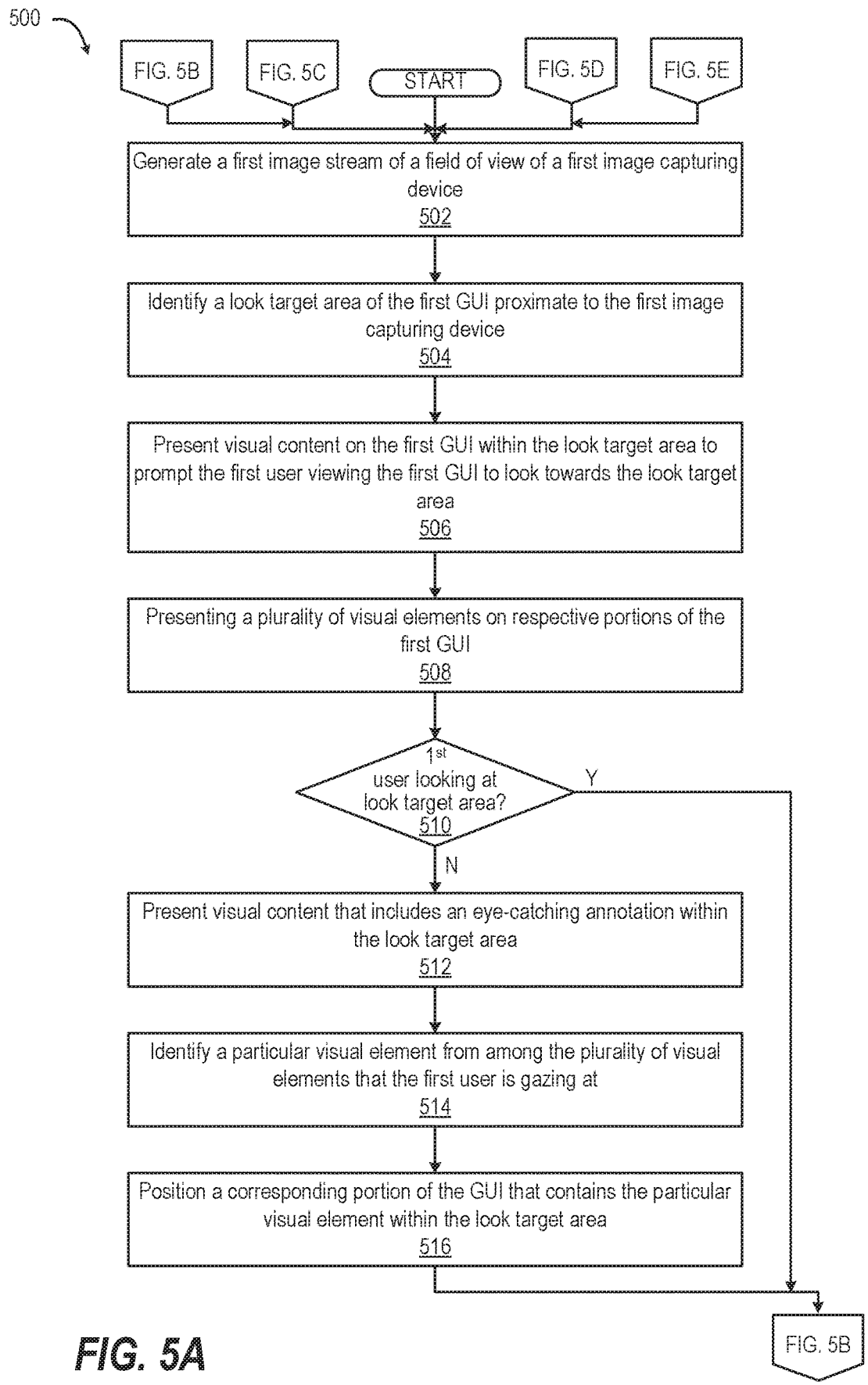
FIGS. 5A-5E (FIG. 5) present a flow diagram of a method for prompting eye-to-eye exchange during a virtual human communication session, according to one or more embodiments.

With reference to FIG. 5A, method 500 includes generating a first image stream of a field of view of a first image capturing device (block 502). The image stream captures a face of the first user viewing a first GUI presented on a first display device of a first communication device. Method 500 includes identifying a look target area of the first GUI proximate to the first image capturing device (block 504). Method 400 includes presenting visual content on the first GUI within the look target area to prompt the first user viewing the first GUI to look towards the look target area (block 506).

In one or more embodiments, method 500 includes presenting a plurality of visual elements on respective portions of the first GUI (block 508). Method 500 includes identifying whether the first user is looking toward the look target area (decision block 510). In response to determining that the first user is not looking toward the look target area, method 500 includes presenting visual content that includes an eye-catching annotation within the look target area (block 512). In one or more embodiments, method 500 includes identifying a particular visual element that the first user is gazing at from among the plurality of visual elements (block 514). Method 500 includes positioning a corresponding portion of the GUI that contains the particular visual element within the look target area (block 516).

Figure 5B:
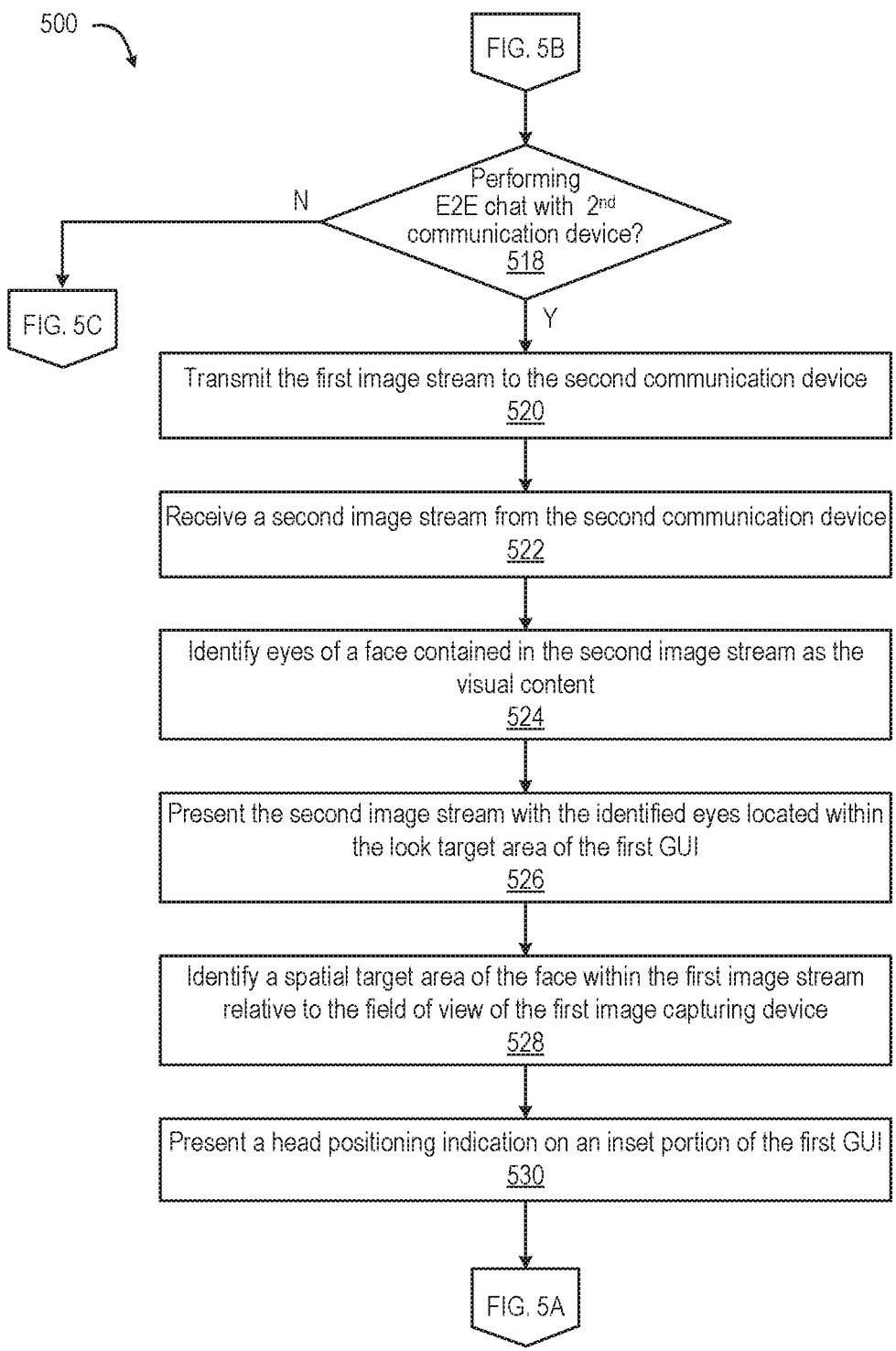

In one or more embodiments, method 500 enables device to support one or more particular types of virtual one-way or two-way communications that benefit from eye-to-eye contact. In response to determining that the first user is looking toward the look target area in decision block 510 or after positioning the corresponding portion of the GUI in block 516, method transitions to FIG. 5B. With reference to FIG. 5B, method 500 includes determining whether a GUI-generating application executing on the first communication device is facilitating an eye-to-eye exchange with a second user using second communication device (decision block 518). In response to determining that the eye-to-eye exchange is being facilitated, method 500 includes transmitting the first image stream to the second communication device (block 520). Method 500 includes receiving a second image stream from the second communication device (block 522). Method 500 includes identifying eyes of a face contained in the second image stream as the visual content (block 524). Method 500 includes presenting the second image stream with the identified eyes located within the look target area of the first GUI (block 526). Method 500 includes identifying a spatial target area of the face within the first image stream relative to the field of view of the first image capturing device (block 528). The spatial target area can be for the face. Positioning the face also aligns the eyes. The spatial target area can be specific to positioning the eyes. Method 500 includes presenting a head positioning indication on an inset portion of the first GUI (block 530). The head positioning indication corresponds to the spatial target area to prompt the first user to position their head so that their eyes are aligned with the head positioning indication. Then method 500 returns to block 502.

Figure 5C:
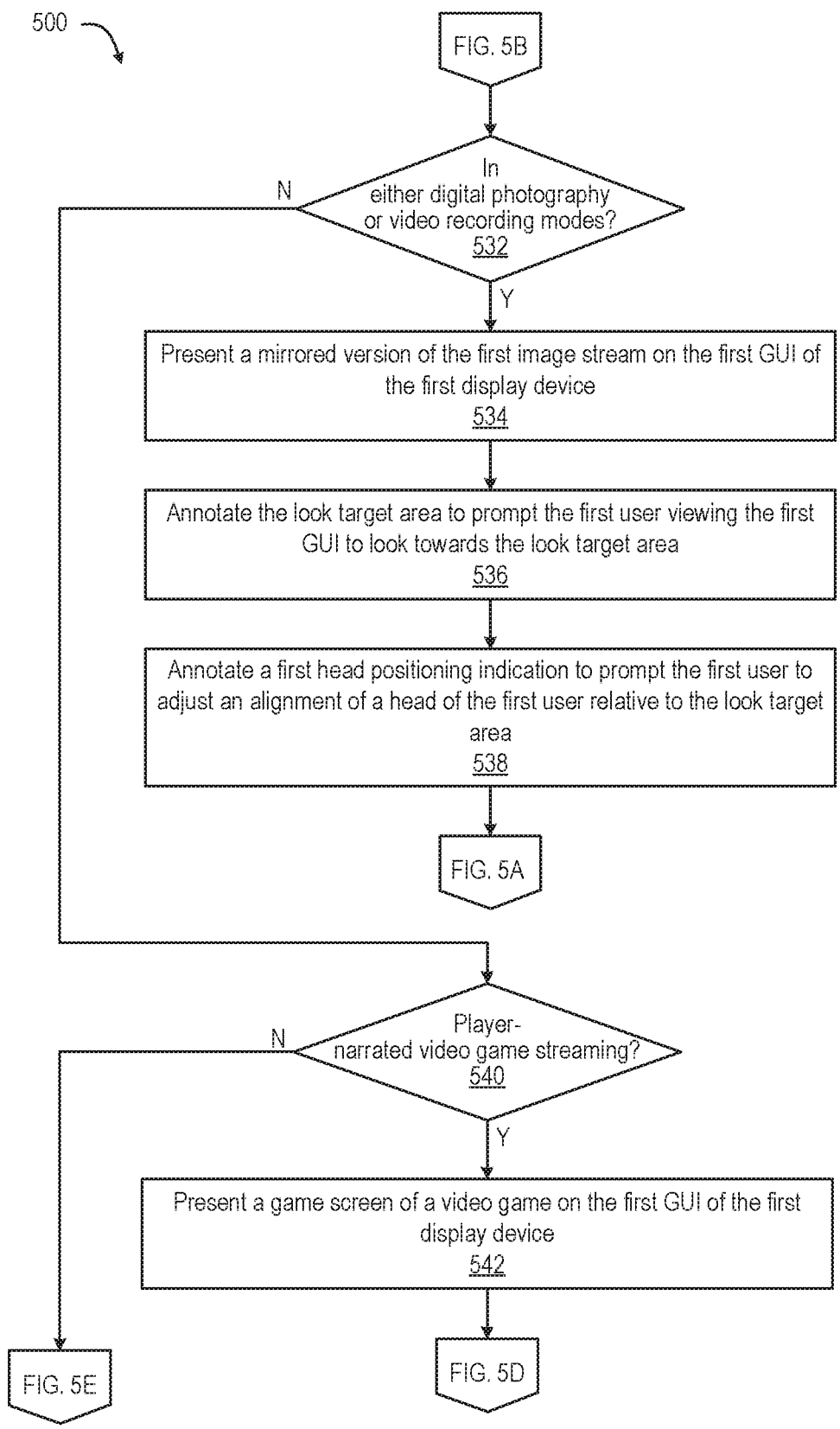

In response to determining in decision block 518 that eye-to-eye exchange is not being performed with the second communication device, method 500 transitions to FIG. 5C. With reference to FIG. 5C, method 500 includes determining whether the first communication device is in one of a digital photography or a video recording modes (decision block 532). In response to determining that the first communication device is in one of a digital photography or a video recording modes, method 500 includes presenting a mirrored version of the first image stream on the first GUI of the first display device (block 534). Method 500 includes annotating the look target area to prompt the first user viewing the first GUI to look towards the look target area (block 536). Method 500 includes annotating a first head positioning indication to prompt the first user to adjust an alignment of a head of the first user relative to the look target area (block 538). Then method 500 returns to block 502.

Figure 5D:
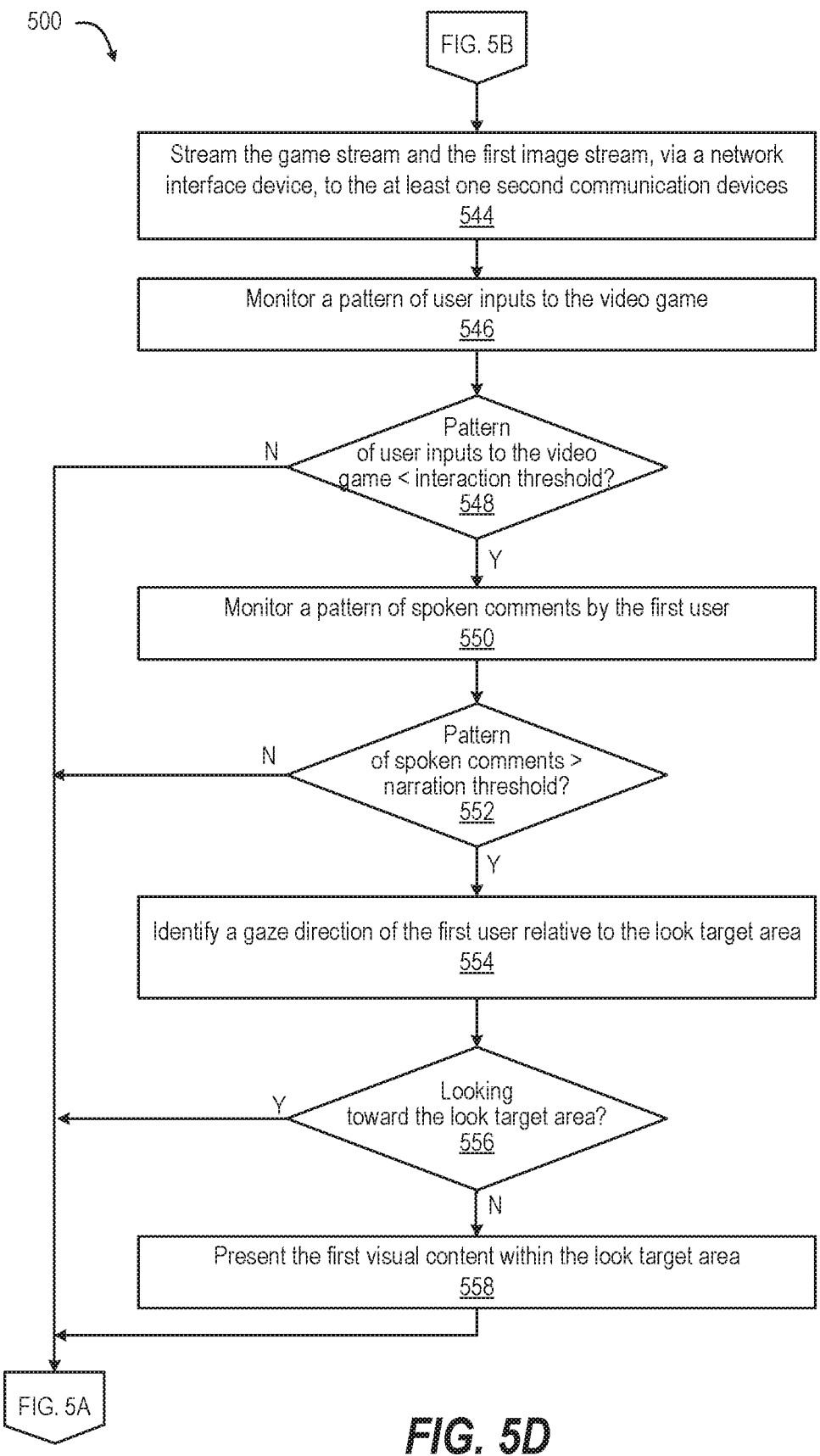

In response to determining that the first communication device is not in one of a digital photography or a video recording modes in decision block 532, method 500 includes determining whether the first communication device is facilitating a player-narrated video game streaming to at least one second communication device (decision block 540). In response to determining that the first communication device is performing a player-narrated video game streaming, method 500 includes presenting a game screen of a video game on the first GUI of the first display device (block 542). As shown in FIG. 5D, method 500 includes streaming the game stream and the first image stream, via a network interface device, to the at least one second communication device (block 544). Method 500 includes monitoring a pattern of user inputs to the video game (block 546). Method 500 includes determining whether the pattern of user inputs to the video game is below an interaction threshold (decision block 548). In response to the determining that the pattern of user inputs to the video game is equal to or greater than the interaction threshold, method 500 returns to block 502 (FIG. 5A). In response to the determining that the pattern of user inputs to the video game is less than the interaction threshold, method 500 includes monitoring a pattern of spoken comments by the first user (block 550). Method 500 includes determining whether the pattern of spoken comments is above a narration threshold (decision block 552). The threshold can be zero with any comment made by the first user indicating an eye-to-eye contact situation. The threshold can be nonzero so that comments or expletives of short duration are ignored so as to not interrupt gameplay. In response to determining that the pattern of spoken comments is equal to or less than the narration threshold, method 500 returns to block 502. In response to determining that the pattern of spoken comments is greater than the narration threshold, method 500 includes identifying a gaze direction of the first user relative to the look target area (block 554). Method 500 includes determining whether the first user is looking toward the look target area (decision block 556). In response to determining that the first user is looking toward the look target area, method 500 returns to block 502. In response to determining that the first user is not looking toward the look target area, method 500 includes presenting the visual content within the look target area (block 558). Then method 500 returns to block 502.

Figure 5E:
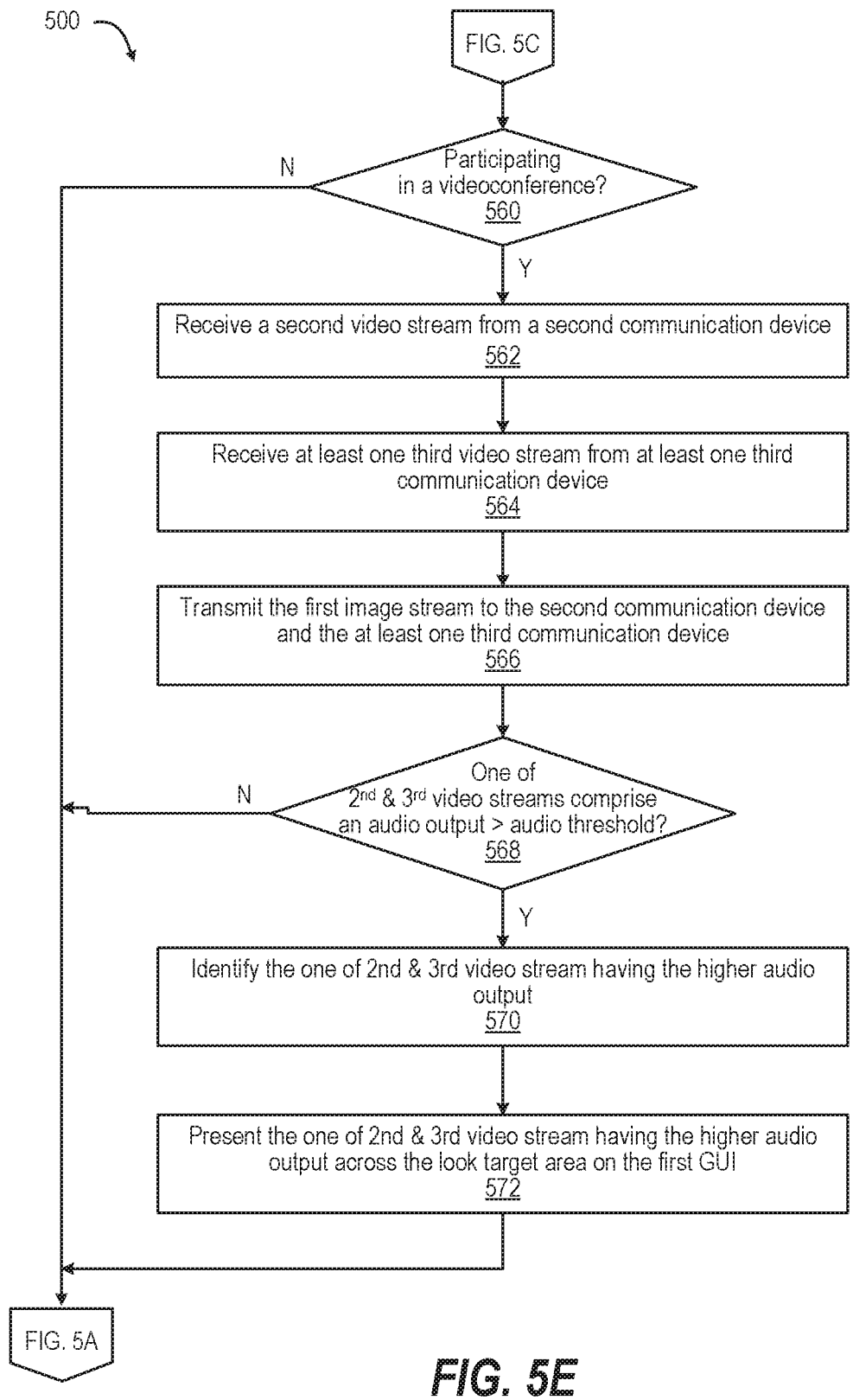

Referring back to FIG. 5C, in response to determining in decision block 540 that the first communication device is not performing a player-narrated video game streaming, method transitions to FIG. 5E. With reference to FIG. 5E, method 500 includes determining whether the first communication device is participating in a videoconference with more than one other communication device (decision block 560). In response to determining that the first communication device is not participating in a videoconference, method 500 returns to block 502 (FIG. 5A). In response to determining that the first communication device is participating in a videoconference, method 500 includes receiving a second video stream from a second communication device (block 562). Method 500 includes receiving at least one third video stream from at least one third communication device (block 564). Method 500 includes transmitting the first image stream to the second communication device and the at least one third communication device (block 566). Method 500 includes identifying whether one of the second video stream and the at least one third video streams comprise an audio output that is above an audio threshold (decision block 568). In response to determining that one of the second video stream and the at least one third video streams comprise an audio output that is not above an audio threshold, method 500 returns to block 502. In response to determining that one of the second video stream and the at least one third video streams comprise an audio output that is above an audio threshold, method 500 includes identifying the one of the second video stream and the at least one third video streams having the higher audio output (block 570). Method 500 includes presenting the corresponding one of the second video stream and the at least one third video stream having the higher audio output across the look target area on the first GUI (block 572). Then method 500 returns to block 502.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
    a first display device that displays visual content of a first graphical user interface (GUI) presented by the display device;
    a first image capturing device having a field of view that captures a face of a first user viewing the first GUI, the first image capturing device generating a first image stream of the field of view; and
    a controller communicatively coupled to the first display device and the first image capturing device and which:
        identifies a look target area of the first GUI, the look target area being an area around a location of the first image capturing device that, when the first user looks towards the look target area, the image capture device captures, within the first image stream, eyes of the first user looking towards the first image capturing device;

presents a visual change at the look target area to a portion of the first GUI that is within the look target area to prompt the first user viewing the first GUI to look towards the look target area;

identifies a spatial target area of the face within the first image stream relative to the field of view of the first image capturing device, the spatial target area corresponding to proper facial positioning by the first user relative to the image capture device to allow the eyes of the first user to look directly at the look target area; and presents a head positioning indication on an inset portion of the first GUI, the head positioning indication corresponding to the spatial target area to prompt the first user to position their head so that their eyes are aligned with the head positioning indication.

2. The communication device of claim 1, wherein in presenting the visual change, the controller:

identifies whether the first user is looking toward the look target area; and presents, as the visual change within the look target area, selected visual content in response to identifying that the first user is not looking toward the look target area.

3. The communication device of claim 1, wherein:

the first image capturing device comprises: (i) a camera under display (CUD) positioned under the first display device under the location corresponding to the look target area; and (ii) a camera driver communicatively coupled to the controller and to the CUD;

the communication device comprises an eye-to-eye display driver communicatively coupled to the CUD position below the look target area of the first GUI of the first display device;

the controller presents unadjusted visual content via the portion of pixels of the look target area in response to identifying that the first user is looking at the look target area; and the controller adjusts at least one of an illumination level and a color of the portion of pixels of the look target area while presenting the visual content, in response to identifying that the first user is not looking at the look target area.

4. The communication device of claim 1, further comprising a memory containing: (i) an eye-to-eye (E2E) system; and (ii) at least one GUI-generating application, wherein the controller executes the E2E system, which causes the communicate device to:

identify pixel coordinates of the look target area;

present visual content on the first display device provided by the at least one GUI-generating application;

determine at least one of: (i) head alignment; and (ii) eye alignment of the first user in the first image stream to identify whether the first user is looking at the look target area, wherein the user looking towards the look target area results in the first image stream presenting the user as looking towards a viewer of the first image stream;

determine an E2E status of the first user from among looking at and not looking at the look target area; and communicate the E2E status to the at least one GUI-generating application;

in response to receipt of a command from the at least one GUI-generating application to present the visual change to the look target area in order to prompt the first user, adjust at least one of a displayed content, an illumination level, or a color of pixels at the pixel coordinates of the look target area.

5. The communication device of claim 1, further comprising:

a network interface device communicative coupled to the controller and by which the controller communicatively couples with at least one second communication device to enable the first user to engage in a virtual communication with a second user of the at least one second communication device; and the controller:

identifies whether the first image stream comprises eyes of the first user being aligned with a spatial target area;

presents the head positioning indication on the inset portion of the first GUI in response to the eyes of the first user being un-aligned with the spatial target area;

identifies whether the first image stream includes a gaze of the first user being directed to the look target area;

presents the visual change within the look target area in response to identifying that the first user is not looking toward the look target area; and transmits the first image stream to the at least one second communication device.

6. The communication device of claim 1, wherein the controller:

in response to identifying that the communication device is in one of a digital photography or a video recording mode:

presents a mirrored version of the first image stream on the first GUI of the first display device;

annotates the look target area to prompt the first user viewing the first GUI to look towards the look target area; and annotates the first head positioning indication to prompt the first user to adjust an alignment of a head of the first user relative to the look target area.

7. The communication device of claim 1, further comprising a network interface device, by which the controller is communicatively coupled to a network video game streaming service and at least one second communication device, wherein the controller:

presents a game screen of a video game on the first GUI of the first display device;

streams the first image stream, via the network interface device, to the at least one second communication devices;

identifies whether the first user is looking toward the look target area;

monitors a pattern of user inputs to the video game;

monitors a pattern of spoken comments by the first user; and presents the visual change within the look target area in response to identifying that: (i) the first user is not looking toward the look target area; and at least one of: (ii) the pattern of user inputs to the video game is below an interaction threshold; and (iii) the pattern of spoken comments is above a narration threshold.

8. The communication device of claim 1, further comprising:
- a network interface device communicative coupled to the controller and by which the controller communicatively couples with a second communication device and at least one third communication device to respectively receive a second video stream from the second communication device and at least one third video stream from the at least one third communication; and
- the controller:
  - identifies whether one of the second video stream and the at least one third video streams comprise an audio output that is above an audio threshold;
  - presents the one of the second video stream and the at least one third video stream across the look target area on the first GUI in response to identifying that the corresponding audio output is above the audio threshold; and
  - transmits the first image stream to the second communication device and to the at least one third communication device.

9. The communication device of claim 1, further comprising:
- a network interface device that enables the communication device to communicatively connect with a second communication device, the network interface device communicatively coupled to the controller; and
- the controller:
  - receives, via the network interface device, a second image stream from the second communication device;
  - identifies, as visual content to prompt eye-to-eye contact by the first user, eyes of a second face contained in the second image stream; and
  - presents the second image stream with the identified eyes located within the look target area of the first GUI.

10. The communication device of claim 1, wherein the controller:
- presents a plurality of visual elements on respective portions of the first GUI;
- identifies whether the first user is looking toward the look target area; and
- in response to identifying that the first user is not looking toward the look target area:
  - identifies a particular visual element from among the plurality of visual elements that the first user is gazing at; and
  - re-positions a corresponding portion of the GUI that contains the particular visual element within the look target area.

11. A method comprising:
- generating a first image stream of a field of view of a first image capturing device, the image stream capturing a face of the first user viewing visual content of a first graphical user interface (GUI) displayed on a first display device of a first communication device;
- identifying a look target area of the first GUI, the look target area being an area on the display device around a location of the first image capturing device that, when the first user looks towards the look target area, the image capture device captures, within the first image stream, eyes of the first user looking towards the first image capturing device;
- identifying whether the first user is looking toward the look target area;
- presenting a visual change at the look target area to a portion of the first GUI that is within the look target area to prompt the first user viewing the first GUI to look towards the look target area, in response to identifying that the first user is not looking toward the look target area;
- identifying a spatial target area of the face within the first image stream relative to the field of view of the first image capturing device, the spatial target area corresponding to proper facial positioning by the first user relative to the image capture device to allow the eyes of the first user to look directly at the look target area; and
- presenting a head positioning indication on an inset portion of the first GUI, the head positioning indication corresponding to the spatial target area to prompt the first user to position their head so that their eyes are aligned with the head positioning indication.

12. The method of claim 11, further comprising:
- transmitting the first image stream to at least one second communication device; and
- receiving a second image stream from the at least one second communication device;
- presenting the second image stream on the first GUI;
- identifying the spatial target area of the face within the first image stream relative to the field of view of the first image capturing device, the spatial target area corresponding to proper facial positioning by the first user relative to the image capture device to allow the eyes of the first user to look directly at the look target area.

13. The method of claim 11, further comprising:
- identifying whether the first image stream captures a gaze of the first user being directed to the look target area;
- presenting the visual content within the look target area in response to identifying that the first user is not looking toward the look target area;
- identifying whether the first image stream comprises eyes of the first user being aligned with a spatial target area; and
- presenting the head positioning indication on the inset portion of the first GUI in response to the eyes of the first user being un-aligned with the spatial target area.

14. The communication device of claim 11, further comprising:
- in response to identifying that the communication device is in one of a digital photography or a video recording mode:
  - presenting a mirrored version of the first image stream on the first GUI of the first display device;
  - annotating the look target area to prompt the first user viewing the first GUI to look towards the look target area; and
  - annotating the first head positioning indication to prompt the first user to adjust an alignment of a head of the first user relative to the look target area.

15. The method of claim 11, further comprising:
- presenting a game screen of a video game on the first GUI of the first display device;
- streaming the first image stream, via a network interface device, to the at least one second communication devices;
- identifying whether the first user is looking toward the look target area;
- monitoring a pattern of user inputs to the video game;
- monitoring a pattern of spoken comments by the first user; and presenting the visual content within the look target area in response to identifying that: (i) the first user is not looking toward the look target area; (ii) the pattern of user inputs to the video game is below an interaction threshold; and (iii) the pattern of spoken comments is above a narration threshold.

16. The method of claim 11, further comprising:

receiving a second video stream from a second communication device;

receiving at least one third video stream from at least one third communication device;

transmitting the first image stream to the second communication device and the at least one third communication device;

identifying whether one of the second video stream and the at least one third video streams comprise an audio output that is above an audio threshold;

presenting the one of the second video stream and the at least one third video stream across the look target area on the first GUI in response to identifying that the corresponding audio output is above the audio threshold; and, transmits the first image stream to the second communication device and to the at least one third communication device.

17. The method of claim 11, further comprising:

receiving a second image stream from a second communication device;

identifying eyes of a face contained in the second image stream as the visual content; and presenting the second image stream with the identified eyes located within the look target area of the first GUI.

18. The method of claim 11, further comprising:

presenting a plurality of visual elements on respective portions of the first GUI;

identifying whether the first user is looking toward the look target area; and in response to identifying that the first user is not looking toward the look target area:

identifying a particular visual element from among the plurality of visual elements that the first user is gazing at; and positioning a corresponding portion of the GUI that contains the particular visual element within the look target area.

19. A computer program product comprising:

a computer readable storage device; and program code on the computer readable storage device that when executed by a processor associated with a first communication device, the program code enables the communication device to provide the functionality of:

generating a first image stream of a field of view of a first image capturing device, the image stream capturing a face of the first user viewing visual content of a first graphical user interface (GUI) displayed on a first display device of a first communication device;

identifying a look target area of the first GUI, the look target area being an area on the display device around a location of the first image capturing device that, when the first user looks towards the look target area, the image capture device captures, within the first image stream, eyes of the first user looking towards the first image capturing device;

identifying whether the first user is looking toward the look target area; and presenting a visual change at the look target area to a portion of the first GUI that is within the look target area to prompt the first user viewing the first GUI to look towards the look target area, in response to identifying that the first user is not looking toward the look target area;

identifying a spatial target area of the face within the first image stream relative to the field of view of the first image capturing device, the spatial target area corresponding to proper facial positioning by the first user relative to the image capture device to allow the eyes of the first user to look directly at the look target area; and presenting a head positioning indication on an inset portion of the first GUI, the head positioning indication corresponding to the spatial target area to prompt the first user to position their head so that their eyes are aligned with the head positioning indication.

* * * * *